US010726032B2

(12) United States Patent
Visbal et al.

(10) Patent No.: US 10,726,032 B2
(45) Date of Patent: Jul. 28, 2020

(54) SYSTEMS AND METHODS FOR SEARCH TEMPLATE GENERATION

(71) Applicant: Palantir Technologies Inc., Palo Alto, CA (US)

(72) Inventors: Alexander Visbal, San Francisco, CA (US); Clare Adrien, Palo Alto, CA (US); Kevin Simons, San Francisco, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 82 days.

(21) Appl. No.: 15/167,652

(22) Filed: May 27, 2016

(65) Prior Publication Data

US 2017/0193061 A1 Jul. 6, 2017

Related U.S. Application Data

(60) Provisional application No. 62/273,330, filed on Dec. 30, 2015.

(51) Int. Cl.
*G06F 16/248* (2019.01)
*G06F 16/2455* (2019.01)
*G06F 16/26* (2019.01)
*G06F 16/25* (2019.01)
*G06F 40/186* (2020.01)
*G06F 3/0481* (2013.01)
*G06F 3/0484* (2013.01)

(52) U.S. Cl.
CPC ........ *G06F 16/248* (2019.01); *G06F 3/04817* (2013.01); *G06F 3/04842* (2013.01); *G06F 16/2455* (2019.01); *G06F 16/252* (2019.01); *G06F 16/26* (2019.01); *G06F 40/186* (2020.01)

(58) Field of Classification Search
CPC .................... G06F 17/30554; G06F 16/248
USPC ....................................... 707/722
See application file for complete search history.

(56) References Cited

U.S. PATENT DOCUMENTS

| 5,568,390 A | 10/1996 | Hirota et al. |
| 5,857,329 A | 1/1999 | Bigham |
| 5,902,349 A | 5/1999 | Endo et al. |
| 6,496,774 B1 | 12/2002 | Davies |

(Continued)

FOREIGN PATENT DOCUMENTS

| EP | 0652513 A1 | 5/1995 |
| EP | 1564666 A1 | 8/2005 |

(Continued)

OTHER PUBLICATIONS

"U.S. Appl. No. 13/196,788, Examiner Interview Summary dated Nov. 25, 2015", 7 pgs.

(Continued)

*Primary Examiner* — Kimberly L Wilson
(74) *Attorney, Agent, or Firm* — Schwegman Lundberg & Woessner, P.A.

(57) ABSTRACT

A case management system is configured to generate search templates based on selection of a search type and one or more data sources. As configured, the case management system enables execution of searches using the generated search template on synchronous and asynchronous data sources and provides periodic polling of the asynchronous data sources to generate consolidated search results.

17 Claims, 10 Drawing Sheets

(56) References Cited

U.S. PATENT DOCUMENTS

| | | | |
|---|---|---|---|
| 6,608,559 | B1 | 8/2003 | Lemelson et al. |
| 7,603,229 | B2 | 10/2009 | Goldberg et al. |
| 7,818,291 | B2 | 10/2010 | Ferguson et al. |
| 7,941,321 | B2 | 5/2011 | Greenstein et al. |
| 8,042,110 | B1 | 10/2011 | Kawahara et al. |
| 8,046,283 | B2 | 10/2011 | Burns et al. |
| 8,108,138 | B2 | 1/2012 | Bruce et al. |
| 8,352,174 | B2 | 1/2013 | Milstein et al. |
| 8,417,409 | B2 | 4/2013 | Bast et al. |
| 8,763,078 | B1 | 6/2014 | Castellucci et al. |
| 8,786,605 | B1 | 7/2014 | Curtis et al. |
| 8,819,620 | B1 | 8/2014 | Volchegursky et al. |
| 8,868,537 | B1 * | 10/2014 | Colgrove .......... G06F 17/30424 235/375 |
| 9,092,482 | B2 | 7/2015 | Harris et al. |
| 9,280,532 | B2 | 3/2016 | Cicerone |
| 2002/0035504 | A1 * | 3/2002 | Dver ................ G06Q 10/06311 705/7.26 |
| 2002/0178252 | A1 | 11/2002 | Balabhadrapatruni et al. |
| 2003/0074090 | A1 | 4/2003 | Becka et al. |
| 2004/0073565 | A1 | 4/2004 | Kaufman et al. |
| 2004/0122807 | A1 * | 6/2004 | Hamilton .......... G06F 17/30646 |
| 2004/0153418 | A1 | 8/2004 | Hanweck |
| 2004/0172445 | A1 | 9/2004 | Singh et al. |
| 2004/0205572 | A1 | 10/2004 | Fields et al. |
| 2005/0240569 | A1 * | 10/2005 | Cheng ................ G06F 17/30427 |
| 2006/0074860 | A1 * | 4/2006 | Ishiguro ............ G06F 17/30398 |
| 2006/0230032 | A1 * | 10/2006 | Brankov .......... G06F 17/30424 |
| 2006/0241856 | A1 | 10/2006 | Cobleigh et al. |
| 2007/0088596 | A1 | 4/2007 | Berkelhamer et al. |
| 2007/0112829 | A1 | 5/2007 | Sanabria et al. |
| 2007/0156888 | A1 | 7/2007 | Hilerio et al. |
| 2007/0185826 | A1 * | 8/2007 | Brice ................ G06F 17/30306 |
| 2007/0198571 | A1 | 8/2007 | Ferguson et al. |
| 2007/0220604 | A1 | 9/2007 | Long |
| 2008/0201333 | A1 | 8/2008 | Rowley |
| 2008/0301559 | A1 | 12/2008 | Martinsen et al. |
| 2008/0313005 | A1 * | 12/2008 | Nessland ................ G06Q 10/06 705/7.21 |
| 2008/0313281 | A1 | 12/2008 | Scheidl et al. |
| 2009/0037912 | A1 | 2/2009 | Stoitsev et al. |
| 2009/0077217 | A1 | 3/2009 | McFarland et al. |
| 2009/0259628 | A1 | 10/2009 | Farrell et al. |
| 2009/0319418 | A1 | 12/2009 | Herz |
| 2010/0162371 | A1 | 6/2010 | Geil |
| 2010/0205616 | A1 | 8/2010 | Lai et al. |
| 2010/0205662 | A1 | 8/2010 | Ibrahim et al. |
| 2010/0235841 | A1 | 9/2010 | Sato |
| 2011/0041084 | A1 | 2/2011 | karam |
| 2011/0153592 | A1 | 6/2011 | DeMarcken |
| 2011/0185401 | A1 | 7/2011 | Bak et al. |
| 2012/0101952 | A1 | 4/2012 | Raleigh et al. |
| 2012/0151272 | A1 | 6/2012 | Behrendt et al. |
| 2012/0290506 | A1 | 11/2012 | Muramatsu et al. |
| 2012/0331472 | A1 | 12/2012 | Moon et al. |
| 2013/0036346 | A1 | 2/2013 | Cicerone |
| 2013/0231862 | A1 | 9/2013 | Delling et al. |
| 2013/0286601 | A1 | 10/2013 | Shin et al. |
| 2014/0046926 | A1 * | 2/2014 | Walton ................ G06Q 50/22 707/710 |
| 2014/0081685 | A1 | 3/2014 | Thacker et al. |
| 2014/0181833 | A1 | 6/2014 | Bird et al. |
| 2014/0222702 | A1 * | 8/2014 | Jennings ............ G06Q 30/0631 705/319 |
| 2015/0120176 | A1 | 4/2015 | Curtis et al. |
| 2015/0127412 | A1 | 5/2015 | Kothandaraman et al. |
| 2015/0134633 | A1 | 5/2015 | Colgrove et al. |
| 2015/0261817 | A1 | 9/2015 | Harris et al. |
| 2015/0310005 | A1 * | 10/2015 | Ryger ................ G06F 17/30011 707/706 |
| 2016/0124955 | A1 * | 5/2016 | Nguyen ............ G06F 17/30445 707/725 |
| 2016/0147730 | A1 | 5/2016 | Cicerone |
| 2016/0225045 | A1 * | 8/2016 | Cumberland ......... G06F 16/248 |
| 2016/0364458 | A1 * | 12/2016 | Thevenet ............ G06F 16/957 |

FOREIGN PATENT DOCUMENTS

| | | | |
|---|---|---|---|
| EP | 1926074 | A1 | 5/2008 |
| EP | 2555126 | A2 | 2/2013 |
| EP | 2876587 | A1 | 5/2015 |
| EP | 3093809 | A1 | 11/2016 |
| EP | 3188051 | A1 | 7/2017 |
| WO | WO-2012025915 | A1 | 3/2012 |

OTHER PUBLICATIONS

"U.S. Appl. No. 13/196,788, Non Final Office Action dated Oct. 23, 2015", 20 pgs.

"U.S. Appl. No. 13/196,788, Notice of Allowance dated Dec. 18, 2015", 17 pgs.

"U.S. Appl. No. 13/657,656, Final Office Action dated May 6, 2015", 29 pgs.

"U.S. Appl. No. 13/826,228, Notice of Allowance dated Mar. 27, 2015", 10 pgs.

"U.S. Appl. No. 14/196,814, Non Final Office Action dated May 5, 2015", 24 pgs.

"U.S. Appl. No. 14/302,279, Non Final Office Action dated Sep. 24, 2015", 10 pgs.

"U.S. Appl. No. 14/302,279, Notice of Allowance dated Apr. 5, 2016", 17 pgs.

"U.S. Appl. No. 14/726,211, Non Final Office Action dated Apr. 5, 2016", 15 pgs.

"Canadian Application Serial No. 2,846,414, Office Action dated Apr. 13, 2016", 5 pgs.

"European Application Serial No. 14162372.8, Extended Search Report dated Apr. 30, 2015", 7 pgs.

"German Application Serial No. 102013221052.3, Office Action dated Mar. 24, 2015", w/ English Translation, 17 pgs.

"German Application Serial No. 102013221057.4, Office Action dated Mar. 23, 2015", w/ English Translation, 17 pgs.

"Help File for ModelRisk Version 5—Part 1", Vose Software, (2007), 375 pgs.

"Help File for ModelRisk Version 5—Part 2", Vose Software, (2007), 362 pgs.

"Netherlands Application Serial No. 2012436, Search Report dated Nov. 6, 2015", w/ English Translation, 8 pgs.

"New Zealand Application Serial No. 623323, First Examination Report dated Apr. 17, 2014", 2 pgs.

"New Zealand Application Serial No. 623323, Further Examination Report dated Jun. 6, 2014", 2 pgs.

Ashraf, "Protect your Google Account (Gmail) by enabling SMS (text message) notifications for Suspicious Activity", online article from dotTech, Jan. 24, 2013, https://dottech.org/94405/how-to-setup-text-message-sms-google-notifications-for-suspicious-activity/, (Jan. 24, 2013), 4 pgs.

Ballesteros, Francisco, et al., "Batching: A Design Pattern for Efficient and Flexible Client/Server Interaction", Transaction on Pattern Language of Programming I, (c) Springer-Verlag Berlin Heidelberg 2009, (2009), 48-66.

Bogle, Phillip, et al., "Reducing Cross Domain Call Overhead Using Batched Futures", OOPSLA '94, (Oct. 1994), 341-354.

Chen, Chia-Ying, et al., "A Novel Emergency Vehicle Dispatching System", 2013 IEEE, (2013), 5 pgs.

Eklund, Peter W., et al., "A Dynamic Multi-source Dijkstra's Algorithm for Vehicle Routing", Intelligent Information Systems, (1996), 5 pgs.

Hart, Peter E., et al., "A Formal Basis for the Heuristic Determination of Minimum Cost Paths", IEEE Transactions on Systems Science and Cybernetics, IEEE, vol. 1, No. 2, (Jul. 1968), 100-107.

Jotshi, Arun, et al., "Dispatching and Routing of Emergency Vehicles in Disaster Mitigation Using Data Fusion", Socio-Economic Planning Sciences, Pergamon, Amsterdam, Netherlands, vol. 43, No. 1, (Mar. 1, 2009), 24 pgs.

(56) References Cited

OTHER PUBLICATIONS

Mohring, Rolf H., "Partitioning Graphs to Speedup Dijkstra's Algorithm", ACM Journal of Experimental Algorithmics, Association of Computing Machinery, New York, New York, vol. 11, (Jan. 1, 2006), 29 pgs.

Reedy, Sarah, "Policy and Charging Rules Function (PCRF)", http://www.lightreading.com/document.asp?doc_id=680015 printed Dec. 10, 2013, (Sep. 13, 2010), 4 pgs.

Stamos, James, et al., "Remote Evaluation", ACM Transactions on Programming Languages and Systems, vol. 12, No. 4, (Oct. 1990), 537-565.

Wagner, Dorothea, et al., "Dynamic Shortest Paths Containers", Electronic Notes in Theoretical Computer Science, vol. 92, No. 1, (2003), 19 pgs.

Yang, Shu, "An Enhanced Routing Method with Dijkstra Algorithm and AHP Analysis in GIS-based Emergency Plan", Geoinformatics, 2010 18th International Conference on, IEEE, Piscataway, New Jersey, (Jun. 18, 2010), 6 pgs.

"U.S. Appl. No. 15/097,842, Non Final Office Action dated Jul. 12, 2016", 31 pgs.

"European Application Serial No. 16169684.4, Extended European Search Report dated Jul. 8, 2016", 6 pgs.

"European Application Serial No. 16207221.9, Extended European Search Report dated May 30, 2017", 7 pgs.

\* cited by examiner

FIG. 4

SEARCH

SEARCH TYPE: PERSON SEARCH - SQ11 ▽

DATA SOURCES (1/19):
- ☑ CASE MANAGEMENT
- ☐ DMV – PERSON
- ☐ DMV – AUTOMOBILE
- ☐ DMV – WATERCRAFT
- ☐ FAA – PERSON
- ☐ FAA – AIRCRAFT
- ☐ SP – PERSON SUBJECT
- ☐ SP – PERSON CROSSING
- ☐ SP – VEHICLE REG.
- ☐ SP – BG CHK
- ☐ SP – INSPECTION LAND
- ☐ SP – INSPECTION AIR/SEA
- ☐ SP – EVIDENCE
- ☐ SP – INCIDENT LOG
- ☐ SP – OI INTERNAL
- ☐ SP – OI PERSON
- ☐ SP OI VEHICLE
- ☐ SH – AF LOG
- ☐ SH – OI
- ☐ SH – WARRANTS
- ☐ TITLE OFFICE – RP

[CLEAR] [SEARCH]

Fields:
- LAST NAME
- RESIDENT ALIEN NO.
- FIRST NAME
- CCW
- NICKNAME
- DRIVER'S LICENSE NO.
- DATE OF BIRTH
- DRIVER'S LICENSE ST.
- DOB - START
- DRIVER'S LICENSE CO.
- DOB - END
- SOCIAL SECURITY NO.
- PASSPORT NUMBER
- VISA NUMBER
- PASSPORT CATEGORY
- PILOT'S LICENSE NO.
- PASSPORT COUNTRY
- PILOT'S LICENSE CO.
- EVENT DATE - START
- WARRANT NUMBER
- EVENT DATE - END
- RACE
- ADDRESS
- GENDER
- TITLE NUMBER
- CITIZENSHIP
- RECORD ID
- CASE NUMBER
- RECORD OFFICE
- ☐ IS NON-SUSPECT?
- ☐ IS ARCHIVED?

SEARCH

SEARCH TYPE
VEHICLE SEARCH - SQ13 ▽

DATA SOURCES (1/4)
☑ CASE MANAGEMENT
☐ DMV - AUTOMOBILE
☐ SP - VEHICLE REG.
☐ SP OI VEHICLE

LICENSE PLATE NUMBER

LICENSE PLATE STATE

LICENSE COUNTRY

VIN

RECORD ID

RECORD OFFICE

CASE NUMBER

☐ IS NON-SUSPECT?
☐ IS ARCHIVED?

CLEAR    SEARCH

Search form fields shown:
- SEARCH
- SEARCH TYPE: CASE SEARCH – GQ05
- DATA SOURCES (1/1)
- ☑ CASE MANAGEMENT
- CASE NUMBER
- CASE CATEGORY
- CASE SUB-CATEGORY
- PROGRAM CODE
- CASE STATUS
- LANGUAGE
- COUNTRY
- PROSECUTION STATUS
- SIGNIFICANT IMPACT
- LEAD SOURCE
- FISCAL YEAR - YY
- CREATION DATE
- CASE DATE (START)
- CASE DATE (END)
- CASE AGENT
- CASE SUPERVISOR
- CASE OFFICE
- CLEAR | SEARCH

600

SYSTEMS AND METHODS FOR SEARCH TEMPLATE GENERATION

CROSS-REFERENCE TO RELATED APPLICATION

This application claims priority to U.S. Provisional Patent Application Ser. No. 62/273,330, filed Dec. 30, 2015, which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2015, PALANTIR TECHNOLOGIES INC., all Rights Reserved.

TECHNICAL FIELD

The subject matter disclosed herein generally relates to generating search templates and records management. Specifically, the present disclosure addresses systems and methods for search template generation, guided searching, and records generation.

BACKGROUND

Business process management (BPM) is the systematic approach to defining a workflow in order to promote efficiency, predictability, and adaptability in an ever-changing environment. In recent years, BPM systems have become more widely used among various organizations wishing to integrate all of their data and processes into a single and unified system. Data processing systems can be used to facilitate BPM through the simultaneous management of a wide array of data objects from a variety of sources, where each data object may have unique management or workflow requirements. In turn, this management may ultimately lead to innovative applications with practical real-world applications. For example, an organization may automate a business process by configuring a data processing system to perform various workflow processes.

BRIEF DESCRIPTION OF THE DRAWINGS

Various ones of the appended drawings merely illustrate example embodiments of the present disclosure and cannot be considered as limiting its scope.

FIG. 4 is a diagram of an example user interface depicting a search template of the case management system, according to some example embodiments.

FIG. 5 is a diagram of an example user interface depicting a search template of the case management system, according to some example embodiments.

FIG. 6 is a diagram of an example user interface depicting a search template of the case management system, according to some example embodiments.

DETAILED DESCRIPTION

Figure 1:
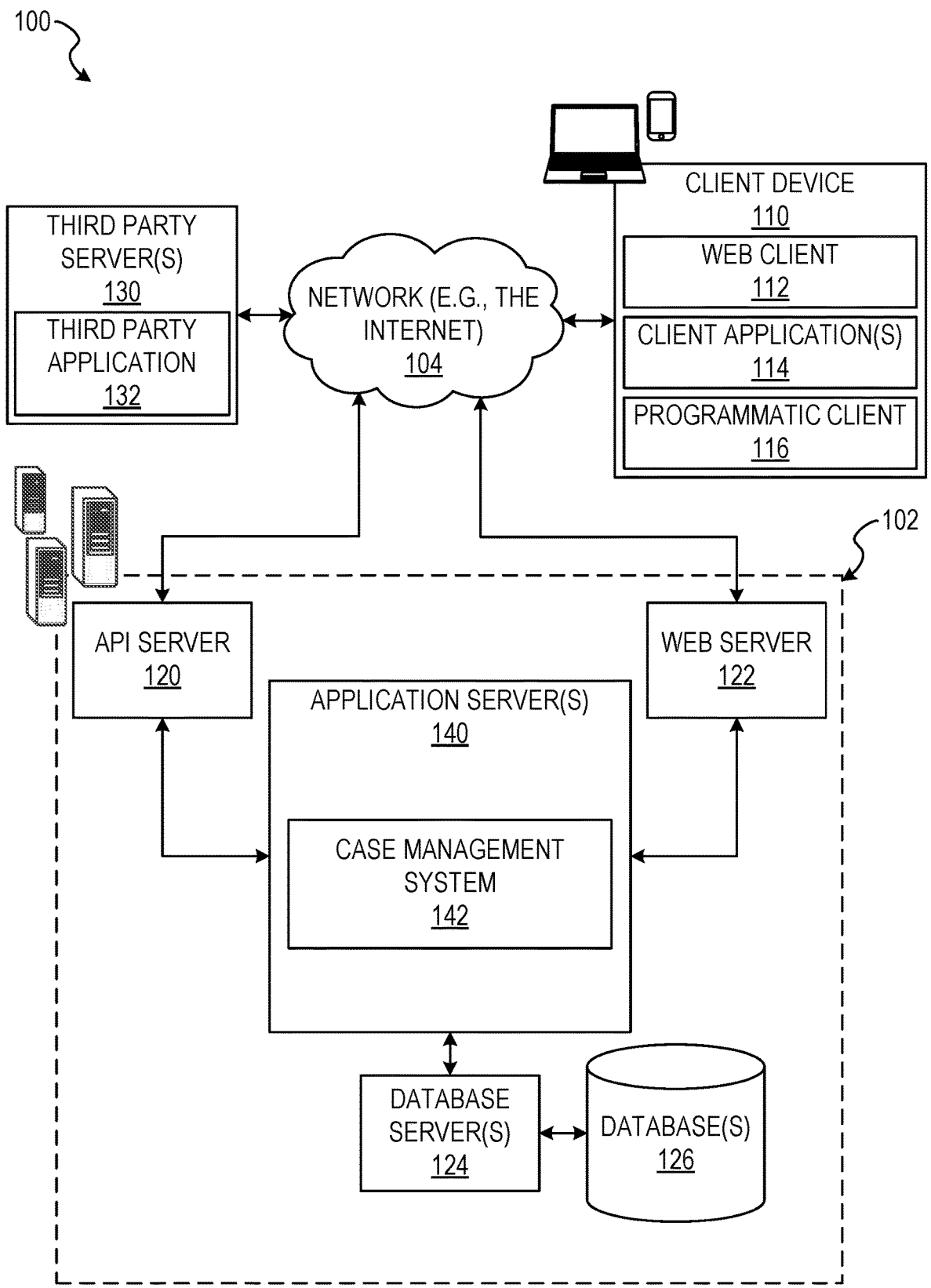
FIG. 1 is a network diagram illustrating a network architecture suitable for generating and managing cases, according to some example embodiments.

Example methods and systems are directed to a case management system configured to generate and manage case data objects. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A case management and search system is configured (e.g., by suitable modules) to provide one or more case and search template generation functions and to execute searches on one or more internal and external data sources (e.g., systems or databases) using integrated plugin modules enabling access by the case management and search system to the external data sources. As configured, the case management and search system enables a user to define a search query, automatically generated as a search template by the case management and search system. The search template may be simultaneously tailored to one or more separate and distinct data sources based on one or more user interface selection. The case management and search system is also configured to enable creation of new records within internal and external data sources based on one or more of search results received and search queries populating the search template. A search template may be understood as a set of data entry fields generated based on specified relationships among the one or more data entry fields of the set of data entry fields. In some embodiments, the search template is presented in a graphical user interface in an order or arrangement based on the specified relationships of among the one or more data entry fields.

As an illustrative example from a user perspective, a user accesses the case management system through a client device, and the case management system enables the user to generate a search template based on selections of a search type and one or more data sources to be searched. The case management system generates the template with safeguards to ensure complete and suitable information has been entered into the search template to perform a search on the selected data sources. Search results may be received from a combination of synchronous and asynchronous data sources. The case management system generates an initial set of results and presents the initial set of results to the user on the client device. When additional results are received from asynchronous data sources, the case management system generates consolidated results, including the initial set of results and the additional results. The case management system transmits a notification to the client device for the consolidated results. The case management system also periodically polls external data sources which have previously failed to provide results for the initial results or the additional results.

Additionally, the case management system generates a search template which returns no results. The user decides to generate a new record from the search query. The case management system generates a record shell and populates the record shell with information provided in the search template and forming the search query. Where the query returns some results, the case management system may incorporate portions of the results into the new record. The case management system stores the new record in one or more of the data sources, both internal and external to the case management system. External data sources may modify the new record within the external data sources once new information has been received, pertinent to the record. Subsequent searches, similar to the one used to generate the new record may return the new record, stored on the internal or external data sources, as a result for the search.

With reference to FIG. 1, an example embodiment of a high-level client-server-based network architecture 100 is shown. A network 104 provides server-side functionality to a client device 110. In some implementations, a user interacts with a networked system 102 using the client device 110. FIG. 1 illustrates, for example, a web client 112 (e.g., a browser, such as the INTERNET EXPLORER® browser developed by MICROSOFT® CORPORATION of Redmond, Wash. State), client application(s) 114, and a programmatic client 116 executing on the client device 110. The client device 110 may include the web client 112, the client application(s) 114, and the programmatic client 116 alone, together, or in any suitable combination. Although FIG. 1 shows one client device 110, in other implementations, the network architecture 100 comprises multiple client devices.

The client device 110 may be a computing device that includes at least a display and communication capabilities that provide access to the network 104. The client device 110 may, for example, be a remote device, workstation, computer, general purpose computer, Internet appliance, hand-held device, wireless device, portable device, wearable computer, cellular or mobile phone, Personal Digital Assistant (PDA), smartphone, tablet, ultrabook, netbook, laptop, desktop, multi-processor system, microprocessor-based or programmable consumer electronic system, game console, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 may comprise an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various example embodiments, the user may be a person, a machine, or other entity that is capable of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the network 104. The user can interact with the networked system 102 using the client device 110. Additionally, a third party application 132, executing on a third-party server 130, is shown as having programmatic access to the networked system 102.

An application program interface (API) server 120 and a web server 122 are coupled to, and provide programmatic and web interfaces respectively to, one or more application servers 140. The application servers 140 may host one or more publication systems comprising the case management system 142, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the networked system 102. The databases 126 may also store digital item information in accordance with example embodiments The third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The case management system 142 may provide functionality operable to perform various case management services described herein. As described above, the case management system may provide search template generation services and perform searches across multiple data sources which may be synchronous or asynchronous with respect to the case management system 142. Each search template generated by the case management system 142 may be tailored to one or more data sources selected for that search template. The case management system 142 may additionally provide data population services to the data sources, supplying data in the form of search query elements to the data sources for searches producing no results.

Further, while the network architecture 100 shown in FIG. 1 employs a client-server architecture, the present inventive subject matter is, of course, not limited to such an architecture, and may equally well find application in a distributed, or peer-to-peer, architecture system, for example. The systems of the applications server(s) 140 (e.g., the case management system 142) may also be implemented as stand-alone software programs, which do not necessarily have networking capabilities.

Figure 2:
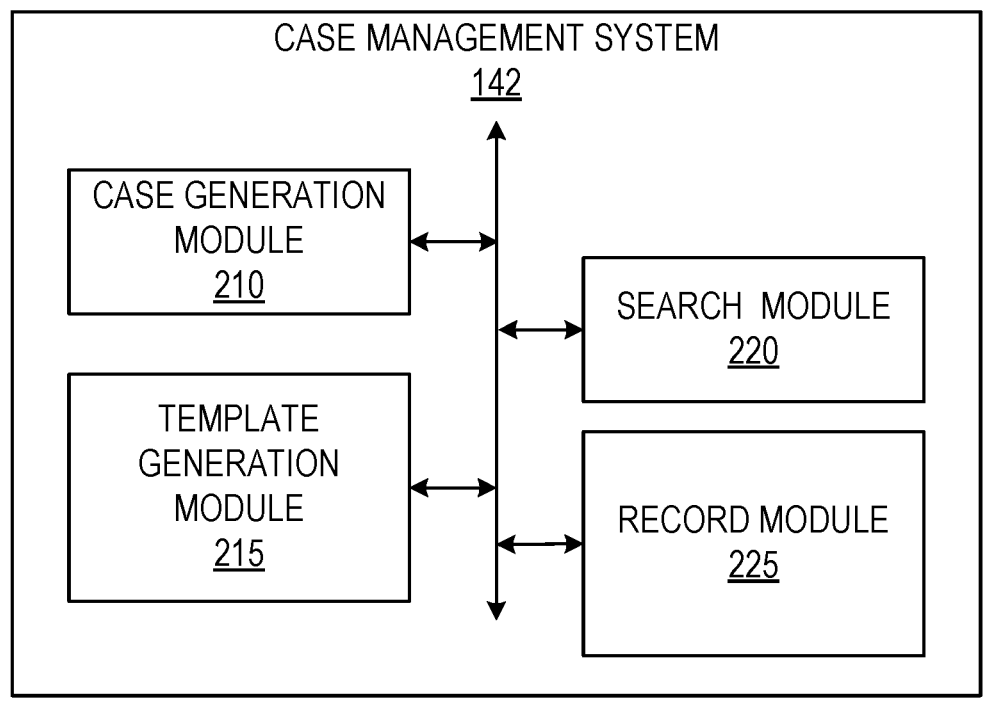
FIG. 2 is a block diagram illustrating an example embodiment of various modules forming a case management system, according to some example embodiments, which is provided as part of the network architecture of FIG. 1.

FIG. 2 is a block diagram illustrating components of the case management system 142 that configure the case management system 142 to generate and manage cases and to generate search templates and execute searches of synchronous and asynchronous data sources based on the generated search templates, according to some example embodiments. The case management system 142 is shown as including a case generation module 210, a template generation module 215, a search module 220, and a record module 225, all configured to communicate with each other (e.g., via a bus, shared memory, or a switch). Any one or more of these modules may be implemented using one or more processors (e.g., by configuring the one or more processors to perform functions described for that module) and hence may include one or more of the processors.

The case generation module 210 generates cases for which searches are performed and search results are stored. In some embodiments, the case generation module 210 creates a case including a case identifier and one or more case properties (e.g., content of the case, a subject, an author). The case generation module 210 may assign object data identified through one or more searches to the case.

The template generation module 215 generates search templates based on selection of user interface elements. In some embodiments, the selection of user interface elements includes elements representing a search type and one or more data sources. The template generation module 215 may generate the search templates based on relationships among the search type and the one or more data sources to provide differing sets of data entry fields.

The search module 220 receives search queries in the form of discrete search query elements. The search module 220 may receive the search query elements based on entry of the search query elements within one or more data entry fields of a generated search template. The search module 220 may perform one or more searches on differing data sources identified within the search template. In some embodiments, the search module 220 performs polling of one or more data sources based on a nature of the data source (e.g., a synchronous data source or an asynchronous data source), a condition, or a status of a search result (e.g., periodic polling based on failure to receive a response from a data source).

The record module 230 generates a new record within one or more of the data sources. In some embodiments, the record module 230 generates the new record based on search query elements within a search query where the search query receives no results from one or more of the data sources. Subsequent searches including similar search query elements may receive the new record, including the previously entered search query elements, as a part of the set of results.

Any one or more of the modules described herein may be implemented using hardware alone (e.g., one or more processors of a machine) or a combination of hardware and software. For example, any described module of the case management system 142 may physically include an arrangement of one or more processors (e.g., a subset of or among the one or more processors of the machine described below with reference to FIG. 10) configured to perform the operations described herein for that module. As another example, any module of the case management system 142 may include software, hardware, or both, that configure an arrangement of one or more processors (e.g., among the one or more processors of the machine) to perform the operations described herein for that module. Accordingly, different modules of the case management system 142 may include and configure different arrangements of such processors or a single arrangement of such processors at different points in time. Moreover, any two or more modules of the case management system 142 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
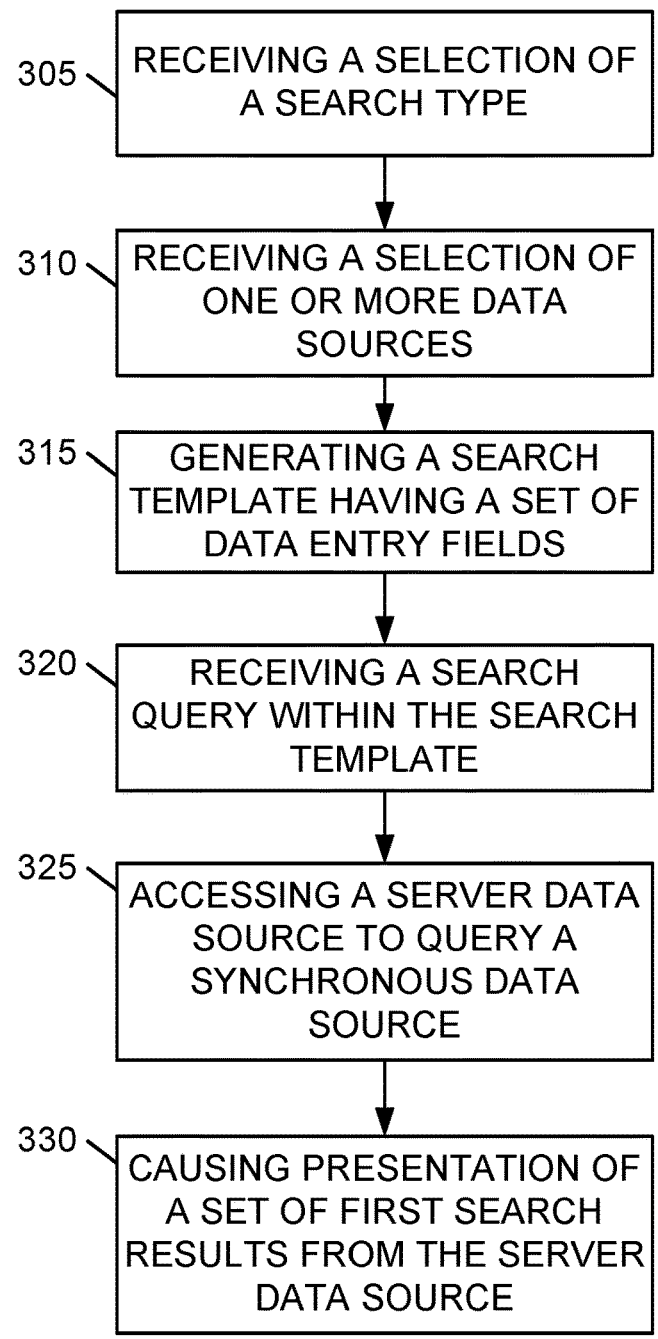
FIG. 3 is a flowchart illustrating operations of the case management system in generating and presenting a search flow template configured to guide a search through one or more data sources, according to some example embodiments.

FIG. 3 is a flowchart illustrating operations of the case management system 142 in performing a method 300 of generating and presenting a search flow template configured to guide a search through one or more data sources, according to various embodiments. As shown in FIG. 3, some example embodiments of the method 300 may be performed by the case management system 142 using the modules described above with respect to FIG. 2. FIG. 3 shows the method 300 including one or more of operations 305, 310, 315, 320, 325 and 330.

In operation 305, the template generation module 215 of the case management system 142 receives a selection of a search type. In some embodiments, the selection of the search type is received via a user interface. For example, the case management system 142 may cause presentation of the user interface having a plurality of selectable user interface elements. A user interface element of the plurality of user interface element may represent one or more search types. For example, the user interface element representing a plurality of search types may be a drop down menu, a scroll wheel menu, or any suitable user interface element configured to present a plurality of options within a single user interface element for selection.

In some embodiments, the search types comprise a person search, a vehicle search, an aircraft search, and a case search. Although described with respect to specific searches, it should be understood that the search types may be comprised of any suitable type of search capable of being defined by a plurality of data entry fields. Each search type may be associated with a set of data entry fields of the plurality of data entry fields. The set of data entry fields associated with a search type may represent data characteristic of a subject of the search type. The data may describe, identify, or differentiate the subject of the search from one or more other subjects.

In operation 310, the template generation module 215 receives a selection of one or more data sources. The one or more data sources are accessible by the case management system 142 via the network 104. In some embodiments, data sources may be associated with the case management system 142 (e.g., internal data sources) or associated with a third-party server (e.g., the third-party server 130). The data sources may by synchronous or asynchronous. Synchronous data sources may be associated with the case management system 142 such that a query to the synchronous data source may be transmitted and results received without traversing the network 104. Asynchronous data sources may be queried by the case management system 142 via the network 104. In some embodiments, the asynchronous data sources may provide results uncoupled from the search query. For example, the asynchronous data sources may provide results in a delayed time frame, such as after a predetermined delay, a scheduled delay, or based on system resources. In some instances, the asynchronous data sources may provide results in an irregular time frame.

As shown in FIG. 4, a user interface 400 may present data sources including a case management data source (e.g., synchronous data source) and data sources for one or more Department of Motor Vehicles (DMV) data sources for a person, automobile, and watercraft; one or more Federal Aviation Administration (FAA) data sources for a person and an aircraft; one or more State Police (SP) data sources for a person subject, a person crossing, a vehicle registration, a background check (BG CHK), an inspection on land, an inspection on air or sea, evidence, an incident log, an ongoing investigation (OI) (e.g., internal investigation, person, or vehicle); one or more sheriff (SH) data sources for an asset forfeiture (AF) log, an OI, and warrants; and one or more Title Office data sources for real property (RP). Although shown with specified data sources, it will be understood that the case management system 142 may enable selection and searching of any suitable data source accessible by the case management system 142. The user interface 400 may be generated by one or more of the case generation module 210 and the template generation module 215.

In some embodiments, the selection of the one or more data sources is received via the user interface. One or more user interface elements of the plurality of user interface elements may represent one or more data sources. As shown in FIG. 4, selectable user interface elements (e.g., icons or check boxes) representing the data sources are presented proximate to the user interface element representing the search type. In some instances, the user interface is presented with a single user interface element for each data source of the one or more data sources. The user interface may also be presented with a single user interface element configured to present and enable selection of the one or more data sources.

In some embodiments, in response to receiving the selection of the search type, the case management system 142 causes presentation of a set of data source elements. The one or more data sources are selected from the set of data source elements. The case management system 142 may generate and cause presentation of one or more user interface elements representing one or more data sources associated with the selected search type. In these embodiments, prior to receipt of the selection of the search type, user interface elements for the data sources may be hidden, obfuscated, or otherwise unselectable.

Returning to FIG. 3, in operation 315, the template generation module 215 generates a search template having a set of data entry fields. The set of data entry fields may comprise one or more data entry fields. In various example embodiments, the case management system 142 generates the search template based on or in response to the selection of the search type and the one or more data sources. The search template may be generated automatically by the case management system 142 selecting one or more data entry fields and populating the user interface with the one or more data entry fields. The case management system 142 generates the search template based on a hierarchical relationship of the search type, the set of data sources, and the data entry fields.

In some embodiments, the search template is generated by selecting a search template from a set of predefined search templates. Predefined search templates may be generated and stored in the form of predefined template files (e.g., JavaScript Object Notation (JSON) text files). Each predefined template file may specify a query structure for a search template associated with the predefined template file. Each predefined template file may specify one or more data sources for a search template represented by the predefined template file, one or more fields for each data source of the one or more data sources, and one or more validations for the associated search template.

The predefined template files may be read by the template generation module 215 from the database 126. In some embodiments, a user interface for the search template may be generated by the template generation module 215 based on the predefined template file being read from the database 126. In some embodiments, the template generation module 215 may pass the selected predefined template file to the client device 110. In these instances, one or more of the web client 112 or the programmatic client 116 of the client device 110 may generate the user interface for the search template based on receiving the selected predefined template file.

As shown in the user interface 400 of FIG. 4, the search template generated for a person search may comprise a plurality of data entry fields configured to receive data representing identifying characteristics of a person. The plurality of data entry fields may comprise data entry fields for a name, a nickname, a date of birth, a date of birth range (e.g., a start date and an end date), a passport number, a passport country, an event date, an event date range (e.g., a start date and an end date), a driver's license number, a driver's license state, a social security number, a visa number, a pilot's license number, a pilot's license country, a race, a gender, a citizenship, a case number, and one or more record references. In some instances, the record references comprise an address, a title number, a record identification (e.g., an identification number or alphanumeric identification), and a record office. Other data entry fields may be used and are not limited to those shown in FIG. 4.

As shown in FIG. 5, the search template generated within a user interface 500 for a vehicle search may comprise a plurality of data entry fields configured to receive data representing identifying characteristics of a vehicle. The plurality of data entry fields may comprise a license plate number, a license plate state, a license country, a vehicle identification number (VIN), a record identification, a record office, and a case number. Other data entry fields may be used and are not limited to those shown on FIG. 5.

As shown in FIG. 6, the search template generated within a user interface 600 for the case search may comprise a plurality of data entry fields configured to receive data representing identifying characteristics of a case within the case management system 142 or the synchronous data source. The plurality of data entry fields may comprise a case number, a case category, a case sub-category, a program code, a case status, a language, a country, a prosecution status, a significant impact, a lead source, a fiscal year, a creation date, a case date range (e.g., start date and end date), a case agent, a case supervisor, and a case office. Other data entry fields may be used and are not limited to those shown on FIG. 6.

Returning to FIG. 3, in operation 320, the case management system 142 receives a search query within the search template. The search query comprises a set of query elements populating the set of data entry fields. The search query may be received via the user interface and may include the set of query elements populating the set of data entry fields. For example, a user of the case management system 142 may enter, via an input device, query elements in the form of text, alphanumeric characters, predetermined selections (e.g., selections from a drop down menu or a scroll menu), or files (e.g., an image file, a video file, or an audio file). One or more query elements of the set of query elements may be automatically populated. For example, the client device 110 may receive a selection of a user interface element representing one or more historical searches. The historical searches may be named or otherwise identified and presented within a pop-up window, a portion of the user interface, or any other suitable manner. Upon selection of one of the historical searches, the case management system 142 may automatically populate one or more query elements of the set of query elements using terms, keywords, or other information provided in the historical search. In some instances, the data entry fields may accept a predetermined type of data or a free form entry.

In operation 325, the search module 220 of the case management system 142 accesses a server data source to query a synchronous data source with one or more search query elements of the set of search query elements. The server data source is associated with the case management system 142 receiving the search template selection. As shown in FIG. 4, the case management data source 410 (e.g., the synchronous data source) is selected. In some embodiments, the case management system 142 may access the server data source internally without communicating via the network 104 or a third-party server. The case management system 142 accesses the case management data source, passing the query elements to the data source to search data contained therein.

In some embodiments, the search module 220 may receive from the client device 110 a populated search query via the application server 140. The populated search query may be generated by user input into the search template generated as a user interface from the specified template file. In some embodiments, the client device 110 may provide paging and sorting information to the search module 220 in the search query. In accessing the synchronous data source, the search module 220 may transform the search query into a new query specifying a custom search indices to search against within the synchronous data source. The search module 220 may transmit the new query to an elastic search cluster within the synchronous data source. The elastic search cluster may perform the search within the synchronous data source and return results to the case management system 142.

In operation 330, the search module 220 causes presentation of a set of first search results from the server data source. In some embodiments, after accessing the server data source, the case management system 142 is provided with the set of first search results. The set of first search results may be formatted based on the data source or a data type received from the data source. After receiving the set of first search results, the case management system 142 may generate a user interface (e.g., a result display presentation or screen) to present the set of first search results.

In some embodiments, each data source associated with the search template may specify a result schema. For example, a person search template may display a name, a date of birth, and an address while a vehicle search may show a license plate number, a vehicle identification number (VIN), and a make and model of a vehicle. Although the available data fields differ based on the search results, the search module 220 may structure the results in a manner common to all data sources and search templates to present a unified user interface presentation for the set of first search results.

Figure 7:
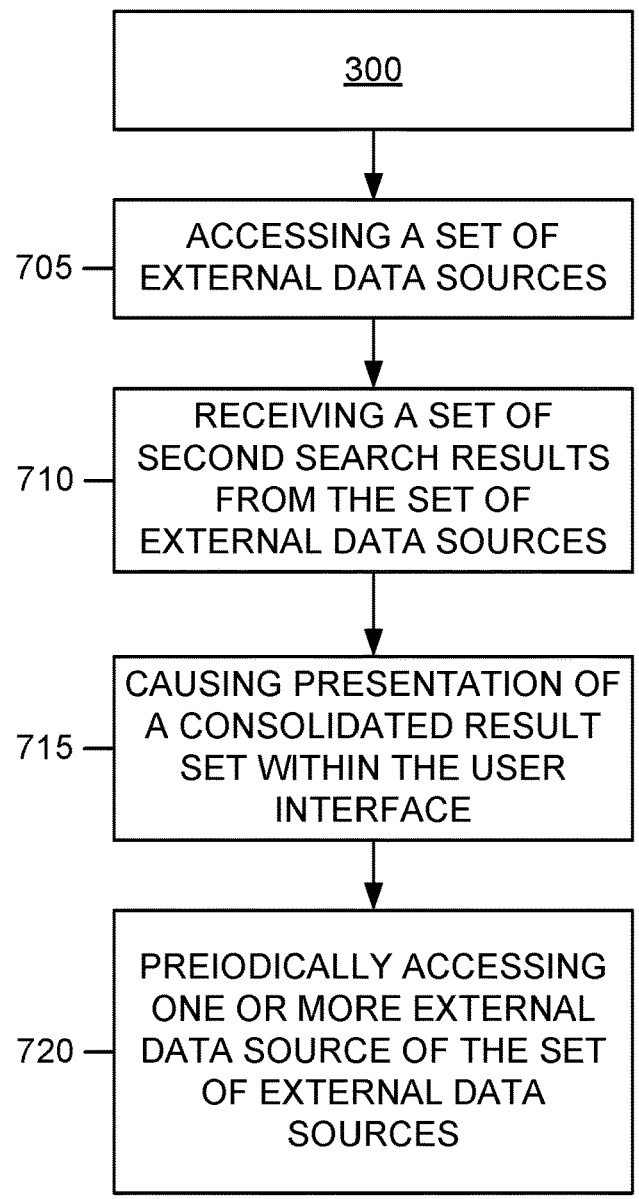
FIG. 7 is a flowchart illustrating operations of the case management system in presenting a search flow template configured to guide a search through one or more asynchronous data sources, according to some example embodiments.

FIG. 7 is a flowchart illustrating operations of the case management system 142 in performing a method 700 of presenting a search flow template configured to guide a search through one or more asynchronous data sources, according to various embodiments. As show in FIG. 7, some example embodiments of the method 700 may be performed by the case management system 142 using modules described above with respect to FIG. 2. FIG. 7 shows the method 700 including one or more of operations 705, 710, 715, and 720.

In operation 705, the search module 220 accesses a set of external data sources to query the set of external data sources with one or more search query elements of the set of search query elements. The set of external data sources may be selected as one or more of the one or more data sources selected in the operation 310. The set of external data sources are external to the case management system 142 and the server data source. For example, the set of external data sources may be a private third-party data source, a governmental or state data source, a non-governmental entity data source, or any other database or data source accessible via the network 104. In some instances, the case management system 142 accesses the set of external data sources via the network 104.

In some instances, the search module 220 may receive from the client device 110 a populated search query via the application server 140. The populated search query may be generated by user input into the search template generated as a user interface from the specified template file. In some embodiments, the client device may provide paging and sorting information to the search module 220 in the search query. In accessing the set of external data sources (e.g., asynchronous data sources), the search module 220 may transmit the search query to a federated search server representing the set of external data sources. The federated search server or the search module 220 may parse the search query into a new query format that it sends to the set of data sources for processing. Once the federated search server initiates the search with the set of external data sources using the new query, the federated search server may generate and transmit an initiation notification indicating the search query is registered and running on the set of external data servers. The federated search server may store the initiation notification as a search status in an associated database.

Upon receipt of search results from one or more external data sources of the set of external data sources, the federated search server may store the search results in the associated database. In some instances, when search results have been received from all of the external data sources of the set of external data sources, the federated search server may mark the search as complete, modifying the status associated with the initiation notification. Search results stored in the database associated with the federated search server may have a per data source expiry. The data source expiry may introduce or be associated with an additional status. The additional status may represent an expiration of the search results. Upon expiration of the search results, the federated search server may provide an indication of expiration to the search module 220. Receipt of the indication of expiration may cause the search module 220 to generate a notification transmitted to the client device 110 to resubmit the search query. Upon expiration of the search results, the federated search server may purge the expired search results from the database associated with the federated search server.

In some embodiments, the case management system 142 accesses the set of external data sources through a set of plugins. Each plugin may be configured to access a predetermined external data source. The plugins may be integrated into a user interface, query functionality, or other portions of systems forming all or part of the external data source which the plugin is tasked with accessing. In some embodiments, the plugins are stored on a plugin service which, when contacted by the case management system 142, recognizes the set of external data sources to be searched and identifies plugins associated with the set of external data sources to conduct the search. The plugins may return the results to the case management system 142 and poll one or more of the external data sources to persistently pursue long range searches (e.g., searches for which results have not yet been returned). Polling of the external databases may be understood as a recurring contact of the external data sources via the network 104 based on one or more condition. The one or more condition may include a time period, a network traffic load, a set contact schedule, combinations thereof, or any other suitable condition.

In operation 710, the search module 220 receives a set of second search results from the set of external data sources. The case management system 142 may receive the set of second search results via the network 104. The set of second search results may be a delayed response to the search query performed on the external data sources and the server data source. The set of second search results may be a response to polling of the external data sources. In some embodiments, the set of second search results is incomplete, including results from a subset of the set of external sources. For example, where the case management system 142 queries three external data sources, the set of second search results may include search results from only one of the external data sources. The case management system 142 may identify the subset of external data sources (e.g., a first subset of external data sources) from which results were received and a second subset of external data sources from which results remain pending.

In embodiments employing the federated search server, the search module 220 may periodically poll the federated search server to retrieve partial or complete results (e.g., the set of second search results) and retrieve the status of the search. The search module 220 may poll the federated search server at predetermined time intervals (e.g., every five minutes), based on network characteristics (e.g., a current network traffic status), or based on any other suitable period. The search results received during polling (e.g., periodic accessing of the federated search server) may be rendered as part of the set of search results at the client device.

In operation 715, the search module 220 causes presentation of a consolidated result set within the user interface. In various example embodiments, the consolidated result set includes the set of first results and the set of second results. In some instances the consolidated result set includes a completion indicator. The completion indicator may indicate data sources of the synchronous data source and the set of external data sources from which results have been received. The completion indicator may also include an estimated delivery time for completion of the set of second search results. In some instances, where one or more data source fails to respond or respond in a timely manner (e.g., within a predetermined time frame), the completion indicator may include an error report. The error report may indicate that a data source is down (e.g., taken offline purposefully, such as for maintenance or an expected closure), unresponsive, slow or unreachable.

In some embodiments, upon receiving the set of second results, the search module 220 identifies one or more external data source from which results were not received. The case management system 142 identifies one or more characteristic for the one or more external data source from which results were not received. The case management system 142 uses the one or more characteristic to generate the completion indicator or the error report.

In some instances, the case management system 142 may include a plugin service, as described above. The plugin service may hold plugins for each data source accessible by the case management system 142. In response to receiving the set of second results which are incomplete, the case management system 142 may transmit a query to the plugin service to identify characteristics for the external data sources which failed to provide results. Each data source plugin may determine one or more types of behavior for each data source. The plugin may be configured to return search characteristics including search timing, average response times, predetermined delays or outages, and other data source characteristics.

In operation 720, the search module 220 periodically accesses one or more external data source of the set of external data sources. As referenced above, the periodic access identifies a status of the query for the set of data sources. In some instances, the case management system 142 is configured to push results as they are received from external data sources. In addition to pushing the results, the case management system 142 may provide modified or updated consolidated results automatically based on receiving additional search results in a delayed response to the initial search. In some embodiments, the case management system 142 generates an update notification indicating a portion of the search results received, the external data source from which the new results were received, the completion indication, or an indication for the modified consolidated results. In some instances, the update notification is a notification within a native application of the case management system 142. The native application may include the search template generation and search user interfaces. The indication for the modified consolidated results may be in the form of a resource link (e.g., uniform resource locator or other network address).

The periodic access of the case management system 142 is performed in accordance with the plugin for the data source being accessed. In some embodiments, the periodic access may be based on a predetermined time delay, a network traffic characteristic (e.g., amount of traffic handled by the network 104), a data source usage characteristic (e.g., current or anticipated workload of the data source at a given time), or a case management system 142 characteristic (e.g., current or anticipated workload of the case management system 142 at a given time).

Figure 8:
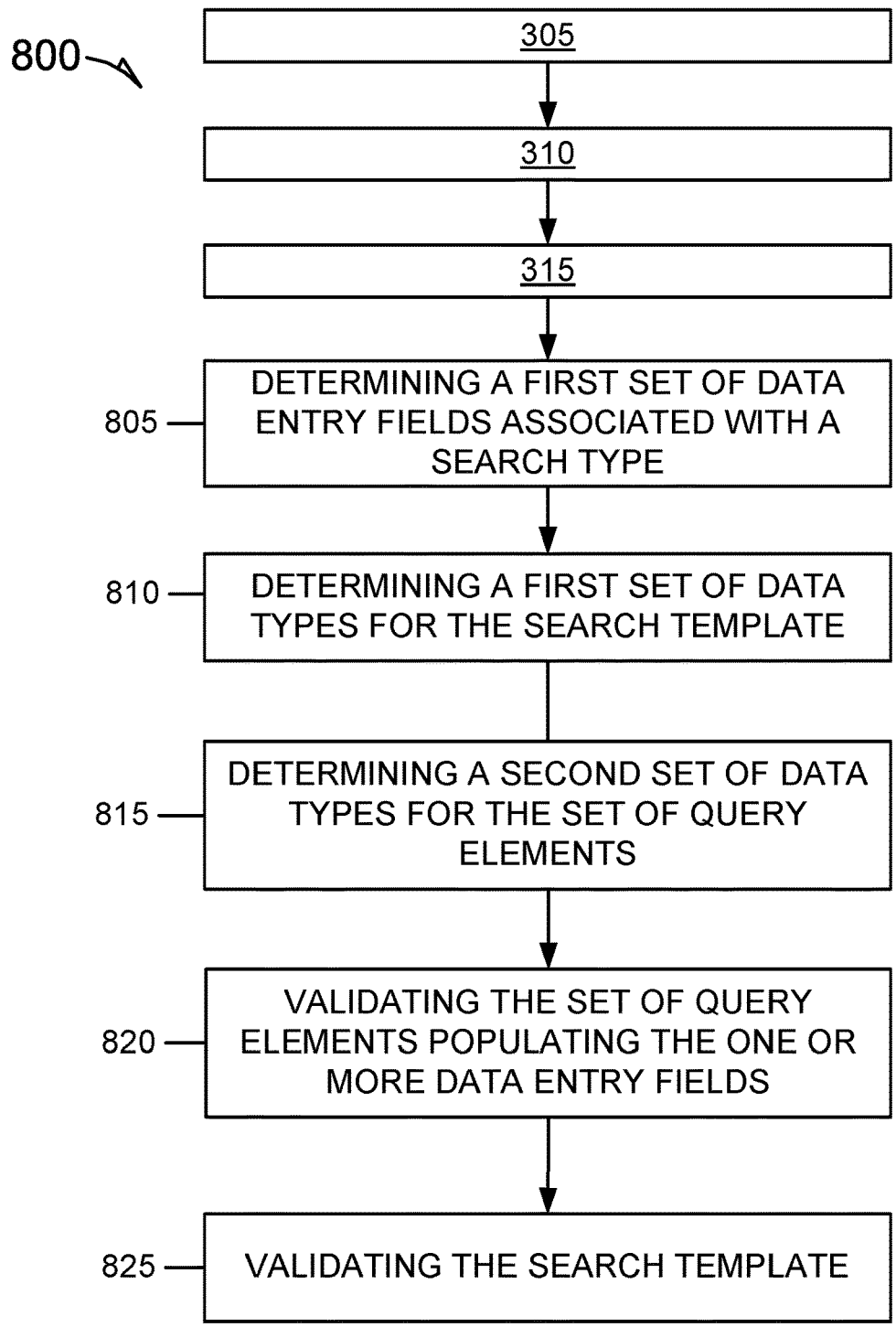
FIG. 8 is a flowchart illustrating operations of the case management system in validating the search template and the set of query elements prior to conducting the search, consistent with some embodiments.

FIG. 8 is a flowchart illustrating operations of the case management system 142 in performing a method 800 of validating the search template and the set of query elements prior to conducting the search, consistent with some embodiments. In some instances, the method 800 may be performed using one or more operations of the methods 300 and 700 or as sub-operations of one or more operations of the methods 300 and 700. As shown in FIG. 8, the method 800 may be initiated by the operations 305, 310, and 315 of the method 300.

In operation 805, the template generation module 215 determines a first set of data entry fields associated with the search type. The first set of data entry fields may be a subset of a full set of data entry fields. In some embodiments, each selectable search type may be associated with one or more data entry fields of the full set of data entry fields. The case management system 142 may determine the first set of data entry fields based on accessing the database 126 to identify the first set of data entry fields based on associations stored within the database 126. In some embodiments, the operation 805 is performed in response to generating the search template in the operation 315. In some instances, the operation 805 is performed as a sub-operation during generation of the search template in the operation 315.

In operation 810, the template generation module 215 determines a first set of data types for the one or more data entry fields of the search template. The first set of data types may be a set of expected or valid characteristics of data to be entered into each respective data entry fields of the one or more data entry fields. For example, each data entry field of the one or more data entry fields may be configured to receive data having one or more predetermined characteristics, such as text only, numbers only, a date, a date range (e.g., a start date and an end date), a predetermined number of characters, an image file, or other types of data having predetermined characteristics. The case management system 142 may generate the first set of data types as a list of the types of data associated with the one or more data entry fields of the search template. The list may include a designation of which data type is associated with each respective data entry field of the one or more data entry fields.

In operation 815, the template generation module 215 determines a second set of data types for the set of query elements. In some embodiments, the case management system 142 may identify query elements entered into each of the data entry fields of the one or more data entry fields of the search template and the data entry field into which each of the query elements has been entered. The case management system 142 may then determine a data type for each of the query elements.

In operation 820, the template generation module 215 validates the set of query elements populating the one or more data entry fields. In various example embodiments, the case management system 142 validates the set of query elements by matching the first set of data types with the second set of data types. In matching the first set of data types with the second set of data types, the case management system 142 may determine that the data type for each query element entered into a data entry field matches the data type for that data entry field.

In some embodiments, where the template generation module 215 determines that one or more query elements of the set of query elements has a data type which is not matched to the data entry field into which the query element is entered, the case management system 142 may generate an error message indicating the mismatched one or more query elements and requesting modification of the mismatched one or more query elements. The case management system 142 may prevent a search from being performed prior to correcting or suitable modifying the mismatched one or more query elements.

For example, where the case management system 142 determines a mismatch between the data type of a query element and a data entry field, the case management system 142 may modify the user interface, causing presentation of the error message as an overlay precluding interaction with a search execution user interface element until corrective action has been taken. In some instances, the case management system 142 modifies the user interface to render the search execution user interface element as unselectable. For example, in response to generating and causing presentation of the error message, the case management system 142 may gray out the search execution user interface element, remove the search execution user interface element, or obfuscate the search execution user interface element.

In operation 825, the template generation module 215 validates the search template by matching the one or more data entry fields of the search template with the first set of data entry fields. In some embodiments, the case management system 142 determines an initial match of a validated subset of data entry fields occurring in the first set of data entry fields. The case management system 142 then validates the search template by matching each of the validated subset of data entry fields within the one or more data entry fields of the search template. The case management system 142 may validate the search template by matching all the data entry fields, which occur in the first set of data entry fields, occur in the one or more data entry fields of the search template.

For example, the search type may be associated with data entry fields for name, date of birth, social security number, country of citizenship, passport number, passport country, pilot's license number, and pilot's license country. The first set of data entry fields may then include data entry fields for name, date of birth, social security number, country of citizenship, passport number, passport country, pilot's license number, and pilot's license country. A first data source of the one or more data sources may be associated with data entry fields for name, date of birth, and social security number. A second data source of the one or more data sources may be associated with data entry fields for name, date of birth, pilot's license number, and pilot's license country. As described, the first set of data entry fields may also include data entry fields for name, date of birth, social security number, pilot's license number, and pilot's license country. The case management system 142 may then validate the search template by determining that the one or more data entry fields of the search template include at least data entry fields for name, date of birth, social security number, pilot's license number, and pilot's license country.

Although described as validating the search template by determining the one or more data entry fields of the search template include all of the data entry fields common to the first set of data entry fields, it should be understood that the case management system 142 may validate the search template in other manners, based on the one or more data entry fields. For example, in some embodiments, the case management system 142 may determine that all of the data entry fields included in the first set of data entry fields are included in the one or more data entry fields of the search template.

In some embodiments, where the case management system 142 determines one or more missing data entry field occurs in the first set of data entry fields and is not included in the one or more data entry fields of the search template. The case management system 142 may generate an error message, indicating the one or more missing data entry fields. The case management system 142 may cause presentation of the error message within the user interface and present a request to add the one or more missing data fields via one or more selectable user interface elements. In some instances, the case management system 142 modifies the search template to include the one or more missing data entry field. Where the case management system 142 modifies the search template, the case management system 142 may preclude a search from being performed until the user interface has been refreshed to reflect the modified search template. Where no search has been attempted, the case management system 142 may refresh the user interface or otherwise cause presentation of the modified search template including the one or more missing data entry fields.

In some embodiments, one or more of the operations 810, 815, 820, and 825 are performed between the operations 320 and 325. In these instances, the case management system 142 may preclude the operation 325, where the case management system 142 detects a mismatch, until corrective action is taken. In some instances, the operations 810, 815, 820, and 825 may be performed as sub-operations of the operation 325 prior to initiation of access to the server data source.

Figure 9:
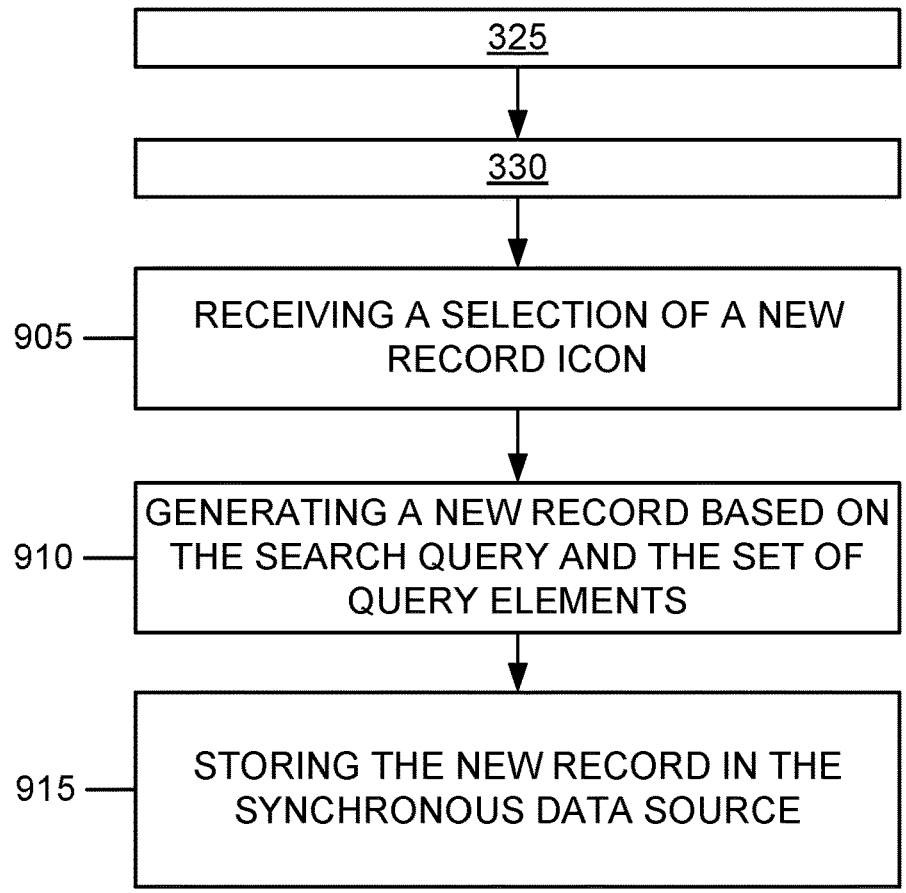
FIG. 9 is a flowchart illustrating operations of the case management system in generating a new record based on one or more sets of search results received by the case management system, according to some example embodiments.

FIG. 9 is a flowchart illustrating operations of the case management system 142 in performing a method 900 of generating a new record based on one or more sets of search results received by the case management system 142. The method 900 may be performed where a search of one or more of the synchronous data source and the external data sources provide no results, limited results, or incomplete results.

In some embodiments, the method 900 may be performed using one or more operations of the methods 300, 700, or 800. The method 900 may be performed in response to one or more operations of the methods 300, 700, or 800. In some embodiments, the case management system 142 initiates the method 900 in response to one or more of the operations 325 and 330. For example, in response to the case management system 142 causing presentation of the set of first search results in the operation 330, the case management system 142 may cause presentation of a new record icon within the user interface. The new record icon may be presented as a selectable user interface element. Interaction with the new record icon may cause the case management system 142 to perform the operations of the method 900.

In operation 905, the record module 225 of the case management system 142 receives a selection of a new record icon. The case management system 142 may receive the selection of the new record icon based on interaction of a user with the user interface through an input device associated with a machine at which the user interface is presented.

In operation 910, the record module 225 generates a new record based on the first set of search results. Although described with respect to generating the new record using search results received by the case management system 142, in some embodiments, the case management system 142 generates the new record based on the search query and the set of query elements comprising the search query.

In response to receiving the selection of the new record icon, the record module 225 generates a record shell for the new record. In some embodiments, after generating the record shell, the case management system 142 populates the record shell with one or more portions of the set of first search results from the operation 330. In some instances, the record module 225 also populates the record shell with one or more portions of the set of second search results received in the operation 710. For example, the record shell may comprise a plurality of data fields, tables, or records configured to receive portions of data returned as part of the search results. In some embodiments, the fields, tables, or records within the record shell are configured for predetermined types of data or predetermined results. For example, the predetermined results may be known data elements such as a name, social security number, or other suitable information which may be returned as part of the set of first search results or set of second search results.

In embodiments where the case management system 142 receives no search results, the record shell is populated based on the search query and set of query elements received by the case management system 142. For example, where the case management system 142 receives a name, a date of birth, a social security number, a country of citizenship, a passport number, and a passport country as the set of query elements, the case management system 142 populates the record shell with the information comprising the set of query elements.

In operation 915, the record module 225 stores the new record in the synchronous data source. The case management system 142 may store the new record in the database 126 hosting the synchronous data source. In some instances, the case management system 142 publishes the new record to one or more of the synchronous data source and one or more of the set of external data sources. Once published, the new record may be searchable within the synchronous data source or the one or more external data sources on which the new record is stored and published. Where the new data record is stored and published on one or more of the external data sources, the external data source or an administrator thereof on which the new record is stored and published may modify the new record to include additional information. In some instances a modified record, generated by modifying the new record to include the additional information, may be retrieved when the case management system 142 receives a subsequent search query comprising the same or similar search query elements as those received in the operation 320.

In some embodiments, each search type has a data source to which new records are published, in response to populating the new record with search results received from the search type. In some instances, the data source to which the new record is published is predetermined. The data source to which the new record is published may populate one or more third-party database with the new record in response to receiving the new record from the case management system 142.

Figure 10:
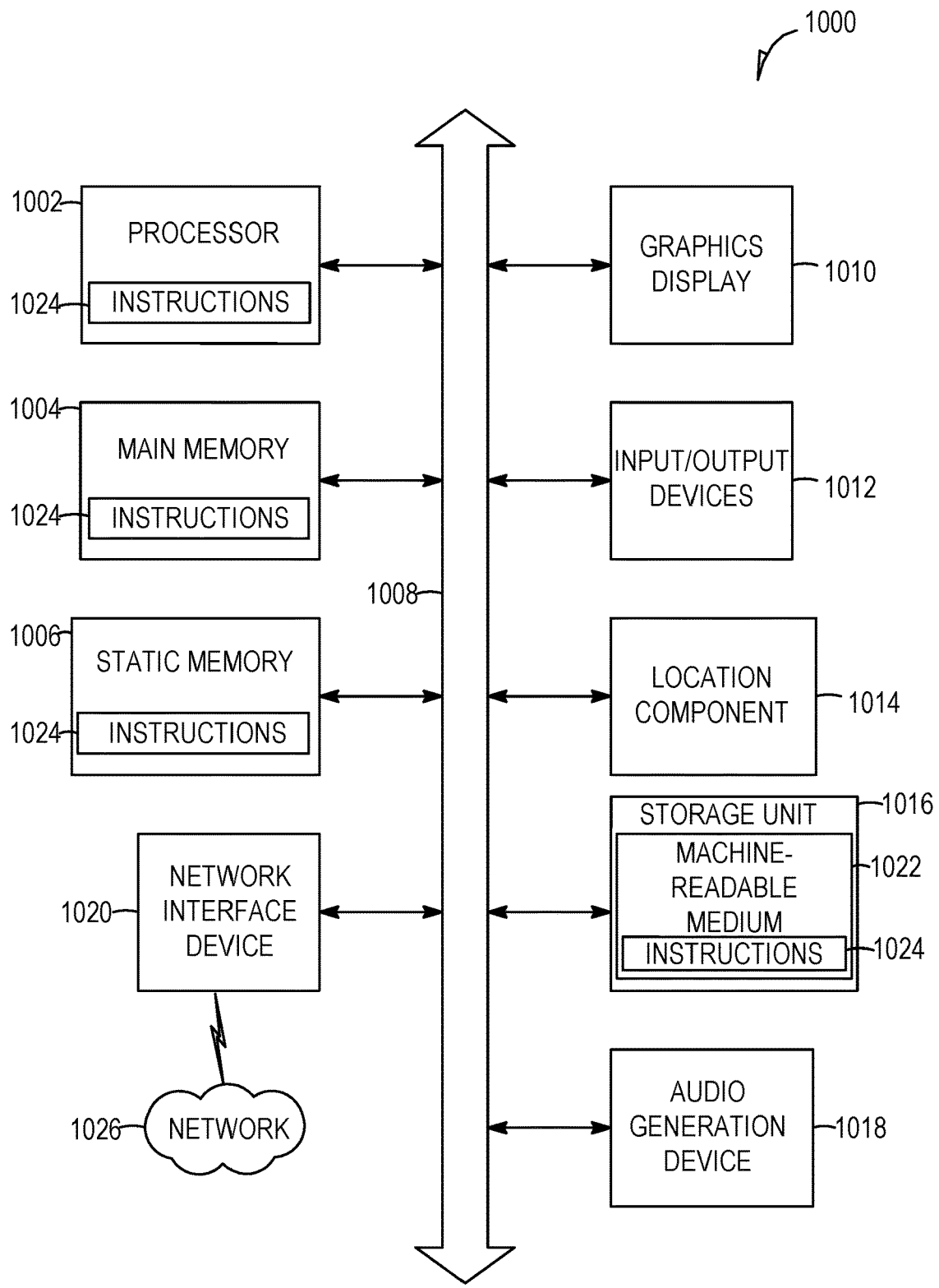
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a PC, a tablet computer, a laptop computer, a netbook, a cellular telephone, a smartphone, a set-top box (STB), a PDA, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multicore CPU (e.g., a dual-core CPU, a quad-core CPU, or a 128-core CPU) within which each of multiple cores is a separate processor that is able to perform any one or more of the methodologies discussed herein, in whole or in part. Although the beneficial effects described herein may be provided by the machine 1000 with at least the processor 1002, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an input/output device 1012 (e.g., a keyboard or keypad, mouse, or trackpad), a location component 1014 (e.g., a GPS receiver), a storage unit 1016, an audio generation device 1018 (e.g., a sound card, an amplifier, a speaker, a headphone jack, or any suitable combination thereof), and a network interface device 1020.

The storage unit 1016 includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the processor 1002 (e.g., within the processor's cache memory), within the static memory 1006, or any combination thereof, before or during execution thereof by the machine 1000. Accordingly, the main memory 1004, the static memory 1006, and the processor 1002 may be considered machine-readable media (e.g., tangible and non-transitory machine-readable media). The instructions 1024 may be transmitted or received over a network 1026 via the network interface device 1020. For example, the network interface device 1020 may communicate the instructions 1024 using any one or more transfer protocols (e.g., hypertext transfer protocol (HTTP)).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., the processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1024 for execution by the machine 1000 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1024).

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module.

Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer implemented method, comprising:
receiving, by one or more processors of a server via a user interface, a selection of a search type;
receiving, by the one or more processors of the server via the user interface, a selection of two or more data sources, the two or more data sources presented in response to receiving the selection of the search type, the two or more data sources comprising at least one synchronous data source and at least one asynchronous data source that provides search results in a delayed time frame;
generating, by the one or more processors of the server, a search template tailored for the two or more data sources based on the search type and the two or more data sources, the search template comprising a set of data entry fields for display within the user interface, the search template generated by selecting a predefined template file that specifies one or more fields for each data source of the two or more data sources;

validating, by the one or more processors of the server, the search template by matching at least a first portion of the set of data entry fields with one or more data entry fields associated with a first data source of the two or more data sources, and matching at least a second portion of the set of data entry fields with one or more data entry fields associated with a second data source of the two or more data sources;

receiving, by one or more processors of the server, a search query comprising a set of query elements populating at least some of the set of data entry fields;

querying, by the one or more processors of the server, the two or more data sources with the search query;

causing, by the one or more processors of the server, presentation of a set of first search results received from the two or more data sources;

receiving, by the one or more processors of the server, a selection of a new record icon; and in response to the selection of the new record icon:
  generating, by the one or more processors of the server, a new record based on the first set of search results, the generating the new record comprising populating the new record with one or more portions of the set of first search results; and
  storing, by the one or more processors of the server, the new record in at least one data source of the two or more data sources.

2. The method of claim 1, further comprising:
causing presentation of a set of data source elements, the two or more data sources selected from the set of data source elements.

3. The method of claim 1, further comprising:
querying a set of external data sources with one or more search query elements of the set of search query elements, the set of external data sources external to the server data source and the server;
receiving a set of second results from the set of external data sources; and
causing presentation of a consolidated result set including the set of first results and the set of second results.

4. The method of claim 3, further comprising:
periodically accessing the set of external data sources, the periodic access identifying a status of the query for the set of data sources.

5. The method of claim 1, further comprising:
determining a first set of data entry fields associated with the search type; and
validating the search template by matching the one or more data entry fields of the search template with the first set of data entry fields.

6. The method of claim 1, further comprising:
determining first set of data types for the one or more data entry fields of the search template;
determining a second set of data types for the set of query elements; and
validating the set of query elements populating the one or more data entry fields by matching the first set of data types with the second set of data types.

7. A computer implemented system, comprising:
one or more processors;
a non-transitory machine-readable storage medium including instructions that, when executed by one or more processors of a machine, cause the machine to perform operations comprising:
receiving, via a user interface, a selection of a search type;

receiving, via the user interface, a selection of two or more data sources, the two or more data sources presented in response to receiving the selection of the search type, the two or more data sources comprising at least one synchronous data source and at least one asynchronous data source that provides search results in a delayed time frame;

generating a search template tailored for the two or more data sources based on the search type and the two or more data sources, the search template comprising a set of data entry fields for display within the user interface, the search template generated by selecting a predefined template file that specifies one or more fields for each data source of the two or more data sources;

validating the search template by matching at least a first portion s of the set of data entry fields with one or more data entry fields associated with a first data source of the two or more data sources, and matching at least a second portion of the set of data entry fields with one or more data entry fields associated with a second data source of the two or more data sources;

receiving, at a server, a search query comprising a set of query elements populating the set of data entry fields;

querying the two or more data sources with the search query;

causing presentation of a set of first search results received from the two or more data sources;

receiving a selection of a new record icon; and in response to the selection of the new record icon:
  generating a new record based on the first set of search results, the generating the new record comprising populating the new record with one or more portions of the set of first search results; and
  storing the new record in at least one data source of the two or more data sources.

8. The system of claim 7, wherein the operations further comprise:
causing presentation of a set of data source elements, the two or more data sources selected from the set of data source elements.

9. The system of claim 7, wherein the operations further comprise:
querying a set of external data sources to query the set of external data sources with one or more search query elements of the set of search query elements, the set of external data sources external to the server data source and the server;
receiving a set of second results from the set of external data sources; and
causing presentation of a consolidated result set including the set of first results and the set of second results.

10. The system of claim 9, wherein the operations further comprise:
periodically accessing the set of external data sources, the periodic access identifying a status of the query for the set of data sources.

11. The system of claim 7, wherein the operations further comprise:
determining a first set of data entry fields associated with the search type; and
validating the search template by matching the one or more data entry fields of the search template with the first set of data entry fields.

12. The system of claim 7, wherein the operations further comprise:
determining first set of data types for the one or more data entry fields of the search template;

determining a second set of data types for the set of query elements; and validating the set of query elements populating the one or more data entry fields by matching the first set of data types with the second set of data types.

13. A non-transitory machine-readable storage medium including instructions that, when executed by one or more processors of a machine, cause the machine to perform operations comprising:

receiving, via a user interface, a selection of a search type;

receiving, via the user interface, a selection of two or more data sources, the two or more data sources presented in response to receiving the selection of the search type, the two or more data sources comprising at least one synchronous data source and at least one asynchronous data source that provides search results in a delayed time frame;

generating a search template tailored for the two or more data sources based on the search type and the two or more data sources, the search template comprising a set of data entry fields for display within the user interface, the search template generated by selecting a predefined template file that specifies one or more fields for each data source of the two or more data sources;

receiving, by the one or more processors of the machine, a search query comprising a set of query elements populating the set of data entry fields;

validating the search template by matching at least a first portion of the set of data entry fields with one or more data entry fields associated with a first data source of the two or more data sources, and matching at least a second portion of the set of data entry fields with one or more data entry fields associated with a second data source of the two or more data sources;

querying the two or more data sources with the search query;

causing presentation of a set of first search results received from the two or more data sources;

receiving a selection of a new record icon; and in response to the selection of the new record icon:
generating a new record based on the first set of search results, the generating the new record comprising populating the new record with one or more portions of the set of first search results; and storing the new record in at least one data source of the two or more data sources.

14. The non-transitory machine-readable storage medium of claim 13, wherein the operations further comprise:

causing presentation of a set of data source elements, the two or more data sources selected from the set of data source elements.

15. The non-transitory machine-readable storage medium of claim 13, wherein the operations further comprise:

querying a set of external data sources to query the set of external data sources with one or more search query elements of the set of search query elements, the set of external data sources external to the server data source and the server;

receiving a set of second results from the set of external data sources;

causing presentation of a consolidated result set including the set of first results and the set of second results; and periodically accessing the set of external data sources, the periodic access identifying a status of the query for the set of data sources.

16. The non-transitory machine-readable storage medium of claim 13, wherein the operations further comprise:

determining a first set of data entry fields associated with the search type; and validating the search template by matching the one or more data entry fields of the search template with the first set of data entry fields.

17. The non-transitory machine-readable storage medium of claim 13, wherein the operations further comprise:

determining first set of data types for the one or more data entry fields of the search template;

determining a second set of data types for the set of query elements; and validating the set of query elements populating the one or more data entry fields by matching the first set of data types with the second set of data types.

* * * * *